United States Patent [19]

Kitamura et al.

[11] 4,451,293

[45] May 29, 1984

[54] SLAG-FORMING AGENT AND PROCESS FOR PRODUCING THE AGENT

[75] Inventors: Minoru Kitamura, Nishinomiya; Toshiyuki Soejima, Kobe; Tsutomu Hayashi; Hideo Matsui, both of Kakogawa; Shigenori Fujisawa, Narashino, all of Japan

[73] Assignee: Quigley Company, Inc., New York, N.Y.

[21] Appl. No.: 392,510

[22] Filed: Apr. 23, 1982

[30] Foreign Application Priority Data

May 31, 1979 [JP] Japan ................................. 54-67665

[51] Int. Cl.³ ............................................. C22B 9/10
[52] U.S. Cl. .......................................... 75/257; 75/53
[58] Field of Search ................................... 75/53, 257

[56] References Cited

U.S. PATENT DOCUMENTS

| | | | |
|---|---|---|---|
| 3,681,050 | 8/1972 | Kazufusa | 75/53 |
| 3,681,051 | 8/1972 | Takashima | 75/53 |
| 3,893,846 | 7/1975 | Takashima | 75/257 |
| 3,915,696 | 10/1975 | Fink | 75/257 |
| 3,957,502 | 5/1976 | Cull | 75/58 |
| 3,984,236 | 10/1976 | Koenig | 75/53 |
| 4,076,522 | 2/1978 | Yoshida | 75/58 |
| 4,093,451 | 6/1978 | Cass | 75/53 |
| 4,331,711 | 5/1982 | Stach | 75/58 |

*Primary Examiner*—Peter D. Rosenberg
*Attorney, Agent, or Firm*—Charles J. Knuth; Peter C. Richardson; Harold W. Ordway

[57] ABSTRACT

A slag-forming agent comprising an aggregate of particulate material having a maximum diameter of 3.0 millimeters and containing at least 15 weight percent magnesium oxide, the aggregate being coated with from 5 to 20 weight percent cement, and a process for producing the agent in which the particulate material is wetted with water to form the aggregate, the wet aggregate is coated with cement and the wet coated aggregate is solidified as such or after being molded.

12 Claims, No Drawings

SLAG-FORMING AGENT AND PROCESS FOR PRODUCING THE AGENT

BACKGROUND OF THE INVENTION

This invention relates to a slag-forming agent useful in steelmaking and a process for producing the agent. More specifically, it relates to a slag-forming agent comprising aggregates of a particulate material containing magnesium oxide, said aggregate being coated with cement, and a process for producing the agent.

Steelmaking is usually performed in metallurgical equipment lined with a refractory, and a slag-forming agent is required. The slag-forming agent is very important, since it helps to determine the properties of the finished steel and greatly affects the erosion of the refractory lining. Slag is classified into two types depending upon the steelmaking operation, one type being a basic slag composed mainly of calcium oxide and the other being an acidic slag composed mainly of silicon dioxide. Basic slag is used when the lining is of a basic refractory and acidic slag is used when the lining is of an acidic refractory.

The slag is formed from the added slag-formation agent, impurities present during the steelmaking, and molten matter resulting from dissolution of the refractory lining and repairing material. In ordinary steelmaking operations, the slag-forming agent should be rapidly melted, that is, rapidly formed into a slag, impurities in the molten metal being more quickly removed when the rate of slag formation is more rapid.

Heretofore, for the formation of basic slag, a slag-forming agent composed mainly of quicklime and/or limestone has generally been used. Since, however, the quicklime or limestone has a high melting point, a melt-promoting agent such as fluorspar has been used. The fluorspar heavily damages the refractory lining, however, and generates fluorine gas which causes a pollution problem. Furthermore, the worldwide supply of fluorspar is scarce. For such reasons, the recent trend is to avoid use of fluorspar as a melt-promoting agent. Thus, slag-forming agents free from fluorspar, such as those containing active dolomitic lime, have been developed.

Active dolomitic lime is a porous dolomite obtained by calcining dolomite (calcium magnesium carbonate) at a temperature of usually from about 900° to about 1,200° C. to release carbon dioxide, and is generally called lightly calcined or light-burnt dolomite. It is presently used in large quantity together with lime as the slag-forming agent in metallurgical equipment lined with a basic refractory.

The rate of melting of light-burnt dolomite is slow, however, and consequently it is not sufficiently utilized during the slag formation. Furthermore, it tends to be reduced to powder during charging into the furnace, during transportion, or during handling for other purposes. Most of such dolomite powder is absorbed by the dust collector during charging, and consequently the charge is not fully available for slag formation.

It is an object of this invention to provide a slag-forming agent which is free from the defects of light-burnt dolomite and has an equal or superior effect to fluorspar in slag formation. It is a further object of the present invention to provide a process for producing the agent.

SUMMARY OF THE INVENTION

According to this invention, there is provided an agent comprising an aggregate of particulate slag-forming material having a maximum particle diameter of 3.0 millimeters containing at least 15 weight percent magnesium oxide, said aggregate being coated with from 5 to 20 percent by weight of cement. Furthermore, there are provided both a process for producing the slag-forming agent, which comprises (a) adding water to a particulate material having a maximum particle diameter of 3.0 millimeters and containing at least 15 weight percent magnesium oxide, (b) mixing the material and water to form a wet aggregate of the material, (c) adding from 5 to 20 percent by weight cement, based on the material, and additional water to the aggregate, and (d) mixing the aggregate, cement and additional water to coat the aggregate with the cement, and a process for producing a molded slag-forming agent in which the coated aggregate is molded into a definite shape.

DETAILED DESCRIPTION OF THE INVENTION

The slag-forming agent of this invention has a very high rate of melting, or slag formation, and is wholly utilized in the slag. It also promotes the slag formation of other slag-forming agents such as lime. This slag-forming agent further has a relatively high strength, since the cement functions as a binder. It therefore resists attrition to a powder during charging, transportation, and handling for other purposes, and its loss to the dust collector during charging is extremely small.

An important characteristic of this invention is that an aggregate, rather than the individual particle, of powdery material is coated with cement. In other words, the individual particles of the material are prevented from being completely contacted with cement. As a result, the strength of this slag-forming agent is not more than that which a suitable slag-forming agent needs. Thus, this agent, while resistant to powdering during ordinary charging, transportation or handling for other purposes, is rapidly disintegrated by the heat of the molten metal.

The aggregate consists of particulate, or powdery, material having a particle diameter of not more than 3.0 millimeters and containing at least 15 weight percent magnesium oxide. The powdery material may include such as calcium oxide, aluminum oxide, silicon dioxide and ferric oxide along with magnesium oxide-containing material. Magnesium oxide-containing materials include magnesia, such as sea water magnesia and calcined magnesite, magnesite (magnesium carbonate), dolomite, calcined dolomite, brick scraps containing these materials, talc, forsterite, and serpentine. Of these, light-burnt magnesite and light-burnt dolomite are preferred.

The reason for limiting the particle diameter of the powdery material to not more than 3.0 millimeters is that when the diameter exceeds 3.0 millimeters, the particles of the material resulting from disintegration of the agent in molten metal are too large and cause a delay in slag formation.

Ordinary mixers such as a simple mortar mixer or a rotary dish-type granulator can be used for forming the initial wet aggregate. A high-speed rotary mixer or other such mixing apparatus can also be used. In the production of this initial wet aggregate, the amount of water added will vary depending upon, for example, the type and particle size of the powdery material used. However, it is generally from 2 to 15 percent by weight, especially from 2 to 5 percent by weight, of the powdery material.

This wet aggregate is then coated with cement by mixing the aggregate and the cement while the aggregate is still wet. In this mixing, the water is again added, its amount generally being from 2 to 15 percent by weight of the powdery material. It is advantageous to use the same mixer employed in producing the initial wet aggregate for this coating operation. If desired, however, other apparatus may be used.

Examples of cement that can be used include Portland cement, alumina cement, slag cement, mixed cement and magnesia cement. The cement functions both as a binder and as a slag-forming agent. The reason for limiting the cement to from 5 to 20 percent by weight of the powdery material is that with less than 5 percent by weight of cement, the slag-forming agent in accordance with this invention is too weak and is susceptible to powdering during handling, while with more than 20 percent by weight of cement, the agent tends to resist disintegration under the action of the heat of the molten metal. The wet aggregate coated with cement is solidified by allowing it to stand in air.

The solidified aggregate may be used as such as the slag-forming agent of the present invention, but it is preferred to use a product made by molding the coated aggregate while it is still wet. The size of the wet coated aggregate introduced to the molding step is not critical, but its diameter is suitably about 1 to 30 millimeters. The molding machine need not be of a special structure, and ordinary pelletizers, tableting machines and briquette-forming machines suffice.

Molded product formed under a pressure of about 100 to 200 kg/cm$^2$ is especially good, and may be of any desired shape. Since cement is used as a binder, the molded product will solidify upon standing in the air.

The size of the molded slag-forming agent of the present invention is not critical, but preferably it is about 5 to 50 millimeters. The molded agent preferably has a collapsing (compressive) strength of about 10 to 20 kg/cm$^2$. If the strength is less than about 10 kg/cm$^2$, the product tends to powder during handling, with attendant losses. When its strength exceeds about 20 kg/cm$^2$, the agent disintegrates more slowly in the furnace after charging, and this reduces the slag-forming effect.

The following working example illustrates the advantages of the present invention.

Lightly calcined (light-burnt) magnesite having a particle diameter of less than 1.0 millimeter was put into a mortar mixer, about 3 percent by weight of water was added, and the mixture was kneaded for about 15 minutes. To the resulting wet mass was added 10 percent by weight of Portland cement followed by about 4 percent by weight of water, both based on the weight of the starting particulate magnesite, to form an aggregate coated with cement. A portion of the wet coated aggregate was solidified by allowing it to stand in air and then used in run No. 1 as the slag-forming agent of the present invention.

A second portion of the wet coated aggregate was molded into the shape of oval briquettes using a drum-type briquette-forming machine including two rotating drums each having a plurality of depressions of about 30 mm × 10 mm in size. In operation, the two drums are rotated as these depressions fit one another, and the wet mass is fed into the depressions for molding. The briquettes were solidified by allowing them to stand in air for about 4 hours. The solidified briquettes were used in run No. 2 as the molded slag-forming agent of the present invention.

Light-burnt dolomite was coated and molded by the above method and the molded product was used in runs No. 3 and No. 4 as the molded slag-forming agent of the present invention.

These slag-forming agents were used in a basic oxygen furnace (BOF) operation as a portion of the charge as indicated in Table I. Runs No. 5 and No. 6 were performed by conventional BOF steelmaking processes, run No. 5 showing the average values obtained using fluorspar as the melt-promoting agent and run No. 6 showing the average values obtained using light-burnt dolomite.

TABLE I

| | | | Charge Material (Unit: Metric Ton) | | | | | |
|---|---|---|---|---|---|---|---|---|
| | Main raw materials | | | Subsidiary raw materials | | | | |
| | | Total charge | Ratio of hot metal | | | Slag-forming agent of the invention | | |
| Run No. | Hot metal | (hot metal plus scrap) | to total charge (%) | Lime | Scale and iron ore | Light-burnt magnesite | Light-burnt dolomite | Fluor-spar | Light-burnt dolomite |
| 1 | 232 | 260.2 | 89.1 | 15.10 | 8.3 | 2.0 | — | — | — |
| 2 | 235 | 260 | 90.4 | 14.07 | 8.0 | 1.7 | — | — | — |
| 3 | 229.4 | 260.2 | 88.1 | 14.40 | 8.0 | — | 4.0 | — | — |
| 4 | 235 | 260 | 90.3 | 14.00 | 8.0 | — | 4.0 | — | — |
| 5 (Average) | 235 | 260 | 90.2 | 14.59 | 7.93 | — | — | 1.58 | — |
| 6 (Average) | 235 | 260 | 90.7 | 14.61 | 8.11 | — | — | — | 3.98 |

The results of each test in Table I are shown in Table II as the V ratio of the steelmaking charge in comparison with the actual V ratio of the formed slag. The V ratio is the ratio of calcium oxide (CaO) to silicon dioxide ($SiO_2$), or $CaO/SiO_2$, in the charge or formed slag.

TABLE II

| | Test Results | | | | | |
|---|---|---|---|---|---|---|
| Run No. | 1 | 2 | 3 | 4 | 5 (Average) | 6 (Average) |
| V ratio | 3.83 | 4.02 | 3.92 | 3.75 | 3.72 | 3.95 |

TABLE II-continued

| Run No. | 1 | 2 | 3 | 4 | 5 (Average) | 6 (Average) |
|---|---|---|---|---|---|---|
| of steel-making charge | | | | | | |
| Actual V ratio of slag | 2.95 | 3.12 | 2.86 | 2.81 | 2.83 | 2.57 |
| Actual V ratio of slag/V ratio of the steel-making charge | 0.77 | 0.78 | 0.73 | 0.75 | 0.76 | 0.65 |

Since the operating conditions are essentially the same for all the runs, except for the conditions shown in Table I, increased V ratio in slag relative to that in the charge indicates a greater amount of slag formed from lime charged, that is, a higher solubility of slag-forming agent. The results in Table III therefore clearly show the desirability of the slag-forming agent of this invention.

We claim:

1. An agent comprising an aggregate of particulate slag-forming material, said material having a maximum particle diameter of 3.0 millimeters and containing at least 15 weight percent magnesium oxide, said aggregate being coated with cement in the amount of from 5 to 20 percent by weight.

2. The slag-forming agent of claim 1 wherein said material is light-burnt magnesite or light-burnt dolomite.

3. The slag-forming agent of claim 1 wherein said cement is Portland cement.

4. The slag-forming agent of claim 1 wherein said coated aggregate is in the form of a molded product.

5. The slag-forming agent of claim 4 wherein said molded product has a size of from about 5 to 50 millimeters and a compressive strength of from about 10 to 20 kilograms per square centimeter.

6. A process for producing a slag-forming agent comprising the steps of
   (a) adding water to a particulate material having a maximum particle diameter of 3.0 millimeters and a magnesium oxide content of at least 15 weight percent;
   (b) mixing said material and said water to form a wet aggregate of said material;
   (c) adding cement in the amount of from 5 to 20 percent by weight, based on said material, and additional water to said aggregate; and
   (d) mixing said aggregate, cement and additional water to coat said aggregate with said cement.

7. The process of claim 6 wherein said particulate material introduced to said process is light-burnt magnesite or light-burnt dolomite.

8. The process of claim 6 wherein said cement introduced to said process is Portland cement.

9. The process of claim 6 wherein said water introduced in each of step (a) and step (c) is in the amount of from 2 to 15 percent by weight of said material.

10. The process of claim 6 wherein said wet coated aggregate is subjected to the further step of molding into a definite shape.

11. The process of claim 10 wherein said wet coated aggregate introduced to said molding step has a diameter of from about 1 to 30 millimeters.

12. The process of claim 10 wherein said molding is accomplished at a pressure of about 100 and 200 kilograms per square centimeter.

* * * * *